(12) United States Patent
Yang et al.

(10) Patent No.: US 11,216,995 B2
(45) Date of Patent: Jan. 4, 2022

(54) VISUALIZATION SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Yeonsoo Yang, Machida (JP); Yuen shyuan Koh, Kita (JP); Ai Matsui, Yokohama (JP); Ayane Iida, Meguro (JP); Hirotaka Ueki, Kawasaki (JP); Masanori Tajima, Kawasaki (JP); Katsuhisa Chiba, Koganei (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/623,247

(22) PCT Filed: Mar. 26, 2018

(86) PCT No.: PCT/JP2018/012010
§ 371 (c)(1),
(2) Date: Dec. 16, 2019

(87) PCT Pub. No.: WO2019/003524
PCT Pub. Date: Jan. 3, 2019

(65) Prior Publication Data
US 2020/0184692 A1 Jun. 11, 2020

(30) Foreign Application Priority Data

Jun. 26, 2017 (JP) .............................. JP2017-124066

(51) Int. Cl.
*G06T 11/20* (2006.01)
*G05B 19/4155* (2006.01)
*G06Q 50/04* (2012.01)

(52) U.S. Cl.
CPC ........ *G06T 11/206* (2013.01); *G05B 19/4155* (2013.01); *G06Q 50/04* (2013.01); *G05B 2219/32146* (2013.01)

(58) Field of Classification Search
CPC combination set(s) only.
See application file for complete search history.

(56) References Cited

U.S. PATENT DOCUMENTS

| 10,360,238 B1 * | 7/2019 | O'Brien | ................. | G06F 16/25 |
| 2005/0283751 A1 * | 12/2005 | Bassin | ................. | G06Q 10/04 717/100 |

(Continued)

FOREIGN PATENT DOCUMENTS

| JP | 2010-40007 A | 2/2010 |
| JP | 2015-75795 A | 4/2015 |

(Continued)

OTHER PUBLICATIONS

International Search Report dated May 15, 2018 in PCT/JP2018/012010 filed Mar. 26, 2018, 1 page.

(Continued)

*Primary Examiner* — Andrew G Yang
(74) *Attorney, Agent, or Firm* — Oblon, McClelland, Maier & Neustadt, L.L.P.

(57) ABSTRACT

A visualization system includes: a first creation section configured to create, for each product manufacturing unit, a line segment connecting a start or end time of a first step to a start or end time of a subsequent second step; a second creation section configured to identify, based on a change log of a step characteristic factor at each manufacturing step, (Continued)

any change in step characteristic factor observed at the first and second steps, and to create a display object representing magnitude of the change in step characteristic factor or including a region representing an attribute of the changed step characteristic factor; and a display control section configured to cause: to display a line segment representing the time axis, created by the first creation section, and the display object, and to display the display objects over positions of the start or end times on time axes of their associated steps.

9 Claims, 8 Drawing Sheets

(56) References Cited

U.S. PATENT DOCUMENTS

| | | | |
|---|---|---|---|
| 2015/0097840 A1 | 4/2015 | Nishimura et al. | |
| 2015/0153730 A1 | 6/2015 | Nishimura et al. | |
| 2016/0005298 A1 | 1/2016 | Takahashi et al. | |
| 2016/0299202 A1* | 10/2016 | Sakuragi | G01R 33/288 |
| 2018/0004194 A1 | 1/2018 | Nishimura et al. | |
| 2018/0259944 A1* | 9/2018 | Oka | G05B 19/41835 |
| 2018/0322765 A1* | 11/2018 | Tappan | G06F 3/04847 |
| 2018/0348745 A1* | 12/2018 | Moore | G05B 23/0272 |

FOREIGN PATENT DOCUMENTS

| | | |
|---|---|---|
| JP | 2015-108904 A | 6/2015 |
| JP | 2015/108905 A | 6/2015 |
| JP | 2015-230577 A | 12/2015 |
| JP | 2016-14992 A | 1/2016 |
| JP | 2017-102669 A | 6/2017 |

OTHER PUBLICATIONS

Panpan Xu, et al., "ViDX: Visual Diagnostics of Assembly Line Performance in Smart Factories" IEEE Transactions on Visualization and Computer Graphics, vol. 23, Issue 1, Jan. 2017, 11 pages.

* cited by examiner

[FIG.3]

(CHANGE LOG)

(MAN ATTRIBUTE CHANGE = 1)
| CHANGE POINT CODE | cp01 |
|---|---|
| CHANGED ATTRIBUTE CLASSIFICATION | man |
| OCCURRENCE TIME | 2017/6/2 11:10:00 |
| RECORDER INFORMATION | OPERATOR B |
| STEP ID | STEP 1 |
| OCCURRENCE LOT ID | ZD1-150107 |
| DETAILS | OPERATOR A CHANGED TO OPERATOR B |

(MEASUREMENT ATTRIBUTE CHANGE = 1)
| CHANGE POINT CODE | cp01 |
|---|---|
| CHANGED ATTRIBUTE CLASSIFICATION | measurement |
| OCCURRENCE TIME | 2017/6/2 11:11:00 |
| RECORDER INFORMATION | OPERATOR B |
| STEP ID | STEP 1 |
| OCCURRENCE LOT ID | ZD1-150107 |
| DETAILS | OO INSPECTION PERFORMED |

(MACHINE ATTRIBUTE CHANGE = 3)
| CHANGE POINT CODE | cp01 |
|---|---|
| CHANGED ATTRIBUTE CLASSIFICATION | machine |
| OCCURRENCE TIME | 2017/6/2 11:11:00 |
| RECORDER INFORMATION | OPERATOR B |
| STEP ID | STEP 1 |
| OCCURRENCE LOT ID | ZD1-150107 |
| DETAILS | OO MEASURE PERFORMED |
| SENSOR MEASUREMENT VALUES | TEMPERATURE: OO° C, ARM ANGLE: □□ DEGREES, ARM SPEED: OO M/S |

VISUALIZATION SYSTEM

TECHNICAL FIELD

The present invention relates to a technique for visualizing the manufacturing status of a product manufactured through a plurality of manufacturing steps in order, and more specifically, to a technique for visualizing any change in step, characteristic factor observed at each manufacturing step.

BACKGROUND ART

A Gantt chart is a conventions used technique for visualizing the manufacturing status of a product manufactured through a plurality of manufacturing steps in order. The Gantt chart includes a plurality of manufacturing steps arranged in time sequence along a vertical axis and time axes extending in parallel along a horizontal axis and associated with the respective manufacturing steps. For each manufacturing unit (lot), the start time or the end time of each manufacturing step is plotted on the time axis of that manufacturing step, and the start times or the end times plotted on the time axes arranged in parallel are connected to each other by line segments, thereby allowing visualization of the manufacturing status in the manufacturing unit.

PRIOR ART DOCUMENT

Patent Document

[Patent Document 1] Japanese Patent Laid-Open No. 2010-040007

DISCLOSURE OF THE INVENTION

Problems to be Solved by the Invention

It is an object of the present invention to provide a visualization system capable of visualizing the manufacturing status of a product manufactured through a plurality of manufacturing steps in order and displaying any change in step characteristic factor observed at each manufacturing step in a visible form.

Means for Solving the Problems

According to an embodiment, a visualization system provides a technique for visualizing the manufacturing status of a product manufactured through a plurality of manufacturing steps in order. The visualization system includes a first creation section configured to create, for each product manufacturing unit, a line segment connecting a start time or an end time of a first step on a time axis of the first step to a start time or an end time of a second step subsequent to the first step on a time axis of the second step in parallel with the time axis of the first step; a second creation section configured to identify, based on a change log of a step characteristic factor at each manufacturing step, any change in step characteristic factor observed at each of the first step and the second step, and to create a display object representing a magnitude of the identified change in step characteristic factor or including a region representing an attribute of the changed step characteristic factor; and a display control section configured to cause a display apparatus to display the time axis of each manufacturing step, the line segment created by the first creation section, and the display object associated with each manufacturing step, and to cause the display apparatus to display the display object associated with the first step and the display object associated with the second step such that these display objects are placed over positions of the start times or the end times on the time axes of their associated steps.

MODE FOR CARRYING OUT THE INVENTION

An embodiment of the present invention will be described with reference to the accompanying drawings. While a plurality of manufacturing steps are hereinafter described as an example in the following description, the concept of "product" as used herein also includes a mechanism for obtaining the result from a plurality of steps such as a waste disposal line for changing waste into recyclable waste through a plurality of steps, a garbage disposal line for disposing garbage by burning the garbage in an incinerator, and a printing line for printing newspapers or other materials, all of which are encompassed within the scope of the present invention. In other words, "product" and "manufacturing" referred to in the present invention are not limited to creation of objects.

Embodiment 1

Figure 1:
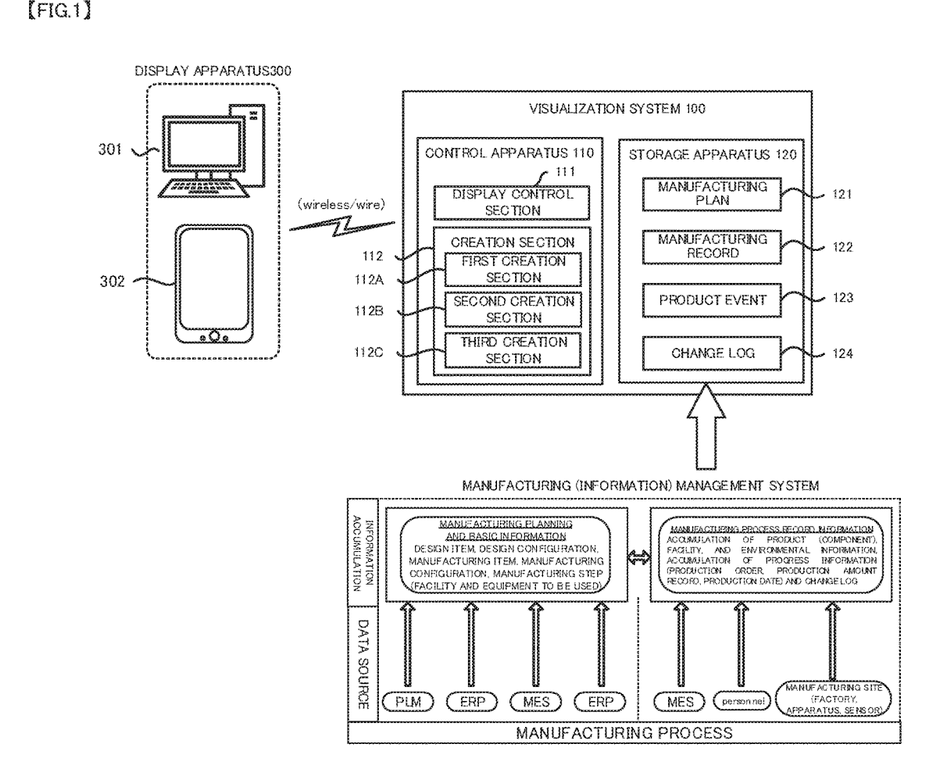
FIG. 1 A block diagram showing the configuration of a visualization system according to Embodiment 1 of the present invention.

FIG. 1 is a block diagram showing the configuration of a visualization system 100 according to Embodiment 1 of the present invention. The visualization system 100 is configured to include a control apparatus 110 and a storage apparatus 120, and is connected to a display apparatus 300 over wireless connection or wired connection. The display apparatus 300 is a display terminal including a display device such as a computer 301, a tablet computer 302, a multi-functional cellular phone, or a Personal Digital Assistant (PDA), and can have a data communication function and a computing function (provided by a CPU or the like) as required.

While Embodiment 1 shows an example in which the standalone display apparatus 300 is connected to the visualization system 100, the present invention is not limited thereto. For example, the visualization system 100 can be connected to a display device to configure the visualization system 100 according to Embodiment 1 as a display apparatus including the functions of the visualization system 100. In other words, the visualization system according to Embodiment 1 can be configured as a single display apparatus.

The visualization system 100 according to Embodiment 1 provides a visualization function of visualizing the manufacturing status at a product manufactured through a plurality of manufacturing steps in order and displaying the manufacturing status on the display apparatus 300. The storage apparatus 120 stores histories including a manufacturing plan 121, a manufacturing record (manufacturing achievement) 122, a product event 123, and a change log 124, for each of the plurality of manufacturing steps.

The various types of information stored in the storage apparatus 120 are supplied from a predetermined manufacturing management system as shown in FIG. 1. The manufacturing management system mainly collects and accumulates, from data sources, various types of information ranging from manufacturing planning and basic information to manufacturing process record information.

Examples of the manufacturing plan 121 include production planning, information about apparatuses/equipment to be used, planned values of production amount, and planned time schedule values of a manufacturing line (including planned time schedule values of steps constituting a manufacturing line). Examples of the manufacturing record 122 include information about products manufactured in manufacturing units (such as the start time, the end time, and the processing period of each of steps constituting the manufacturing line), statuses of facilities in operation, environmental information, inspection results, production amount records, and record values including change histories based on quality control, later described. The manufacturing record 122 can be configured to store information collected from data sources such as facility equipment or sensor equipment used at the manufacturing steps constituting the product manufacturing line and to include sensor values acquired from such sensor equipment.

The start time and the end time of each of the steps for each product manufacturing unit may be the input time to and the output time from each step, respectively. Specifically, the start time and the end time of each of the steps for each product manufacturing unit are the start time and the end time set for the processing period of the step, and assuming that the processing period or the step starts at its input time and ends at its output time, the input time and the output time correspond to the start time and the end time of the step, respectively.

Figure 2:
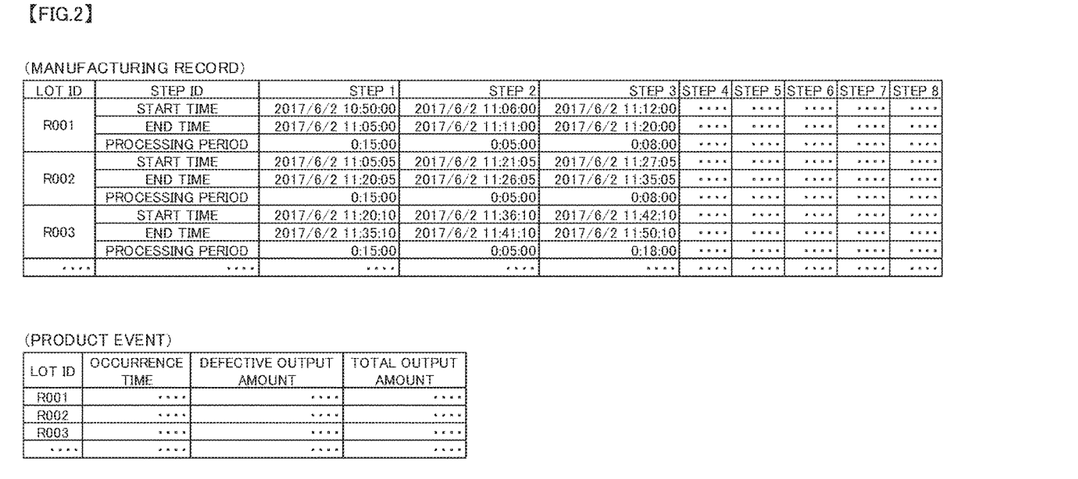
FIG. 2 Tables showing data examples of a manufacturing record and a product event according to Embodiment 1.

FIG. 2 shows a table illustrating a data example of the manufacturing record 122. The example of FIG. 2 shows an aspect in which a set of products of the same type serving as a production unit (a product manufacturing unit, or a lot) goes through a plurality of steps. In the manufacturing record, a plurality of manufacturing steps constituting a manufacturing line are associated with lot IDs of products going through the manufacturing line, and each of the lot IDs is associated with the start time, the end time, and the processing period (the end time minus the start time). The manufacturing steps are assigned sequential step IDs in the order of steps determined previously based on the production planning.

The lot ID is the number assigned uniquely to each production unit of manufactured products. A plurality of products given the same lot ID are manufactured, and each of the products having the same lot ID is assigned a unique manufacturing number. The lot is a set of products of the same type serving as the production unit, that is, a minimum production unit of products to be manufactured under the same conditions, and one lot contains one or more products. Thus, the visualization system 100 according to Embodiment 1 is applicable not only to the lot but also to any other manufacturing unit when the production unit is "one."

The manufacturing record 122 shown in FIG. 2 indicates that a step 1 of products having a lot ID "R001" started at a time "10:50:00" and ended at a time "11:05:00." A subsequent step 2 of the products having the lot ID "R001" started at a time "11:06:00" and ended at a time "11:11:00." Products having a lot ID "R002" are input to the step 1 subsequently to the lot ID "R001." It is shown that the step 1 of the products having the lot ID "R002" started at a time "11:05:05" and ended at a time "11:20:05." It is also shown that the subsequent step 2 of the products having the lot ID "R002" started at a time "11:21:05" and ended at a time "11:26:05."

The above example shows that, after the processing of one manufacturing unit (with the lot ID "R001") at one manufacturing step was completed, the processing of the different manufacturing unit (with the lot ID "R002") started. A single manufacturing step may involve a plurality of machines, facilities, or processes. In such a case, at the time when processing of one manufacturing unit in a first machine, facility, or process is completed and the manufacturing unit proceeds to processing in a second machine, facility, or process, processing of a different manufacturing unit in the first machine, facility, or process is started. In this manner, the plurality of manufacturing units may be processed in parallel within one manufacturing step. One step in Embodiment 1 may involve one machine, facility, or process, or a plurality of machines, facilities, or processes. While Embodiment. 1 is described in conjunction with the product manufacturing steps, the same mechanism is applicable to operation monitoring including a plurality of monitoring processes, for example.

The product event 123 includes a defective rate in each lot (a rate of the number of defective products to the total number of products contained in each lot) or a production rate (a rate of the production number calculated by subtracting the number of defective products from the total number of products contained in each lot). When the manufacturing unit is one, that one product is determined to be nondefective or defective. For example, the product event 123 treats a defect inspection as "event," and in response to this event, accumulates the results of the inspection for each product manufacturing unit.

FIG. 2 also shows an example of the product event 123. Each lot ID is associated with a defective output amount and a total output amount. For example, a defect inspection event occurs which counts the number of defective products and the total number of products contained in a lot alter an inspection step, and an occurrence time in the example of FIG. 2 indicates the time of the defect inspection in which the number of defective products and the total number of products were counted. The defective output number and the total output number stored in the product event 123 can be used to calculate the defective rate and the production rate.

The change log 124 is a change history based on a predetermined quality control rule. For example, the manufacturing step has step characteristic factors called "4M," "5M," "5M1E" and "6M." Depending on what is managed, "4M" has four factors including Man, Machine, Material, and Method in the field of machining, and Man, Machine, Media, and Management in the analysis of cause and examination of measures for accidents or disasters. "5M" is used for quality control classification in factories and has five factors including Man, Machine, Material, Method, and Measurement. The manufacturing step may be unstable in some environments, and to address this, quality control is performed with "5M1E" including Environment added to "5M," or with "6M" including Management added to "5M" to control the whole process. The "4M," "5M," "5M1E" and "6M" come from the initial letters of those factors and the factors have their attributes (classifications).

For Man (operator), the defective rate may depend on the ability of an operator, and an operator change history (history of change from personnel A to personnel B) can be accumulated in the change log 124. For Machine (machine and facility), the product quality characteristics may depend on machines or facilities, or the quality characteristics may change when maintenance is performed such as replacement or adjustment of machines or facilities. A machine/facility change history (maintenance history) can be accumulated in the change log 124.

For Material, the product yield may depend on the supplier or brand of materials even when the same type of material is used. A material change history (history of supplier change or material change) can be accumulated in the change log 124. For Method (operation method), the operation efficiency may change when an operation method is altered, or the operation efficiency may change when the procedures of an operation method are altered. An operation method change history (change in procedure or operation details) can be accumulated in the change log 124.

For Measurement, the measured values may vary or be unstable depending on a measurer, measurement device, or measurement method. A measurement change history (change in measurer, measurement device, or measurement method) can be accumulated in the change log 124. For Environment, the manufacturing step (including the inspection step) may be unstable when the temperature, humidity, season, time period, vibration, sound, or light changes. An environment change history (environment change at each manufacturing step) can be accumulated in the change log 124.

While the attributes of the factors in "5M1E" are described, a change history of each factor in "4M," "5M," and "6M" can be accumulated similarly in the change log. Media (media and environment) in "4M" represents a factor mainly involved in a medium between Man and Material, such as operation environment, manual, and operation information. Management in "6M" means the management of strategies on how to operate a factory in the future such as differentiation from other companies or human resource development.

Figure 3:
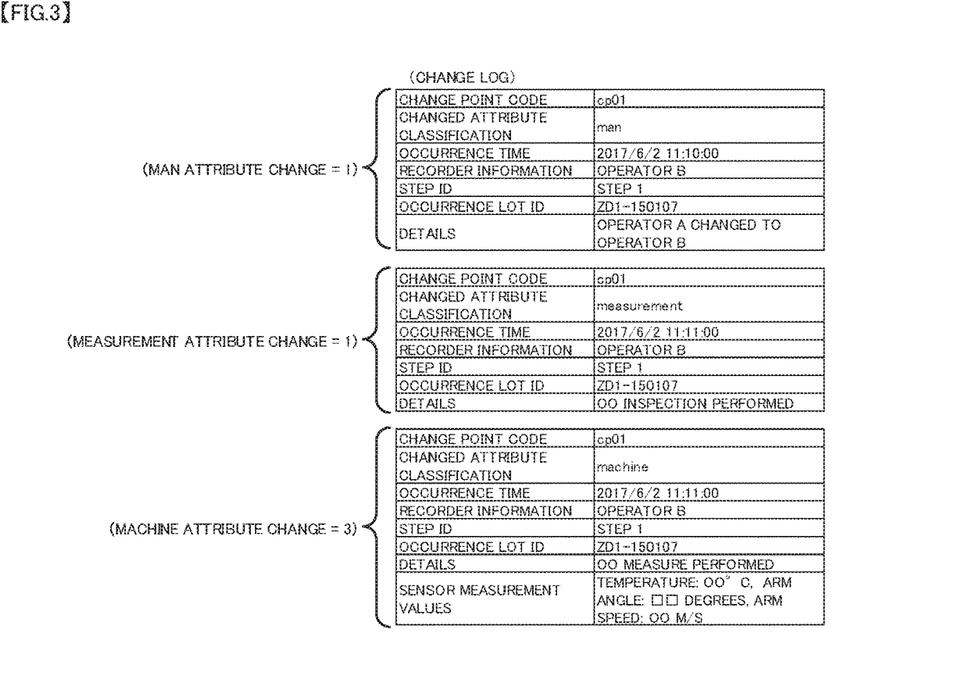
FIG. 3 Tables showing a data example of a change log according to Embodiment 1.

FIG. 3 shows a data example of the change log 124. Description is made herein with "5M" used as an example. As shown in FIG. 3, the change log 124 includes items such as a change point code, a changed attribute classification (for 5M classification), an occurrence time, recorder information, a step ID, an occurrence lot ID, details (description of how a step characteristic factor changes), and a sensor measurement value. When any change in step characteristic factor occurs, the change log 124 identifies the changed attribute classification, the step at which the change in step characteristic factor occurs, and the lot ID being processed at that time.

The change log 124 can be accumulated from daily operation reports made by an operator stored in recorder information, or the change log 124 can be created automatically in response to a signal indicating a change in step characteristic factor provided from the manufacturing management system and then accumulated. The example of FIG. 3 shows that a change in Man attribute occurs at the step 1, an operator A is changed to an operator B, and the lot ID at that time is "ZD1-150107." A change value "1" of Man attribute change is created.

It is also shown that a change in Measurement attribute occurs at the step 1, the operator B performs a predetermined inspection of the facility equipment, and the lot ID at that time is "ZD1-150107." A change value "1" of Measurement attribute change is created.

It is also shown that a change in Machine attribute occurs at the step 1, the operator B performs predetermined maintenance of the facility equipment, and the lot ID at that time is "ZD1-150107." A change value "3" of Machine attribute change is created since three changes occur, including a change in temperature setting, a change in arm angle, and a change in arm speed. When a plurality of changes occur in the same attribute, different change logs 124 may be created for those changes. In this case, the change logic 124 of Machine attribute at the step 1 can be aggregated to create the change value "3."

It should be noted that various types of information stored in the storage apparatus 120 may be collected and stored directly from data sources without the intervening manufacturing management system. In this case, the control apparatus 110 of the visualization system 100 can have an information processing function of editing and processing the information collected from the data sources into various types of information for use in visualizing the manufacturing status of a product manufactured through a plurality of manufacturing steps in order.

The change log 124 may be included in the manufacturing record 122 and collected therefrom. Thus, the visualization system 100 can have an information processing function of creating various type of information for use in visualizing the manufacturing status such as the manufacturing record 122 and the change log 124 based on the information received from the manufacturing management system, instead of independently receiving the change log 124 from the manufacturing management system.

Figure 4:
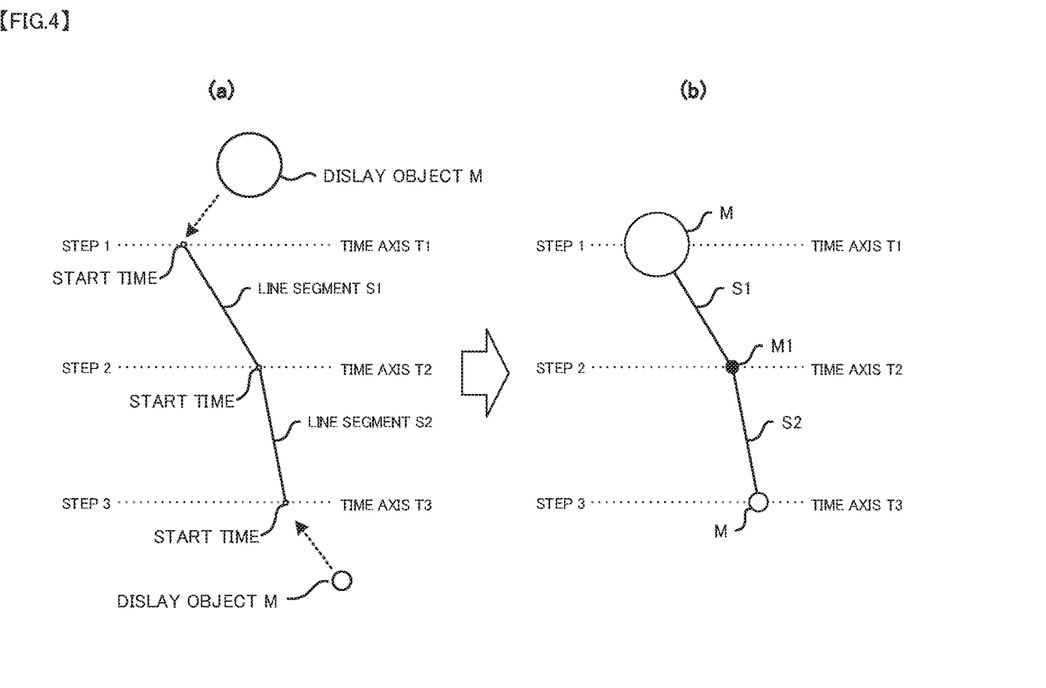
FIG. 4 Diagrams showing examples of visualization of a manufacturing status in one manufacturing unit according to Embodiment 1.

Next, visualization processing according to Embodiment 1 is described. FIG. 4 shows display examples of visualization of the manufacturing status of a product manufactured through a plurality of manufacturing steps in order. Time is represented along the horizontal axis, and manufacturing steps in time sequence are represented along the vertical axis. Time axes T1, T2, and T3 are provided for the respective manufacturing steps and are arranged in parallel from the top.

The control apparatus 110 according to Embodiment 1 includes a creation section 112. The creation section 112 is configured to include a first creation section 112A, a second creation section 112B, and a third creation section 112C. The creation section 112 acquires, from the manufacturing record 122, the start times of the manufacturing steps for each lot ID. While the following description is may in conjunction with an aspect using the start time of each manufacturing step, the end time may be used instead.

The first creation section 112A creates, for each product manufacturing unit (lot), a line segment S1 connecting the start time of a first step 1 on the time axis T1 of the first step 1 to the start time of a second step 2 subsequent to the first step 1 on the time axis T2 of the second step 2 in parallel with the time axis T1 of the first step 1. It is also possible that marks indicating the start times are plotted on the time axes T1 and T2 of the manufacturing steps and then the line segment S1 is created to connect the marks plotted on the time axes T1 and T2 between the steps, that is, to connect the start times between the steps 1 and 2. Similarly, the first creation section 112A creates a line segment S2 connecting the start time of the second step 2 on the time axis T2 of the second step 2 to the start time of a third step 3 subsequent to the second step 2 on the time axis T3 of the third step 3 in parallel with the time axis T2 of the second step 2.

As described above, the first creation section 112A creates the line segments sequentially connecting the start times on the time axes of adjacent ones of the manufacturing steps arranged in time sequence for each manufacturing unit (product or lot) in the manufacturing line.

The second creation section 112B identifies any change in step characteristic factor observed at each of the first step 1, the second step 2, and the third step 3 based on the change log 124 of the step characteristic factor for each manufacturing step and creates an object M representing the identified change in step characteristic factor. The second creation section 112B may display the object M so as to clearly show the presence or absence of any change in step characteristic factor, for example by displaying an object M1 having a different appearance (in terms of size or shape) when no change occurs in step characteristic factor, as later described.

As shown in FIG. 4(a), a display control section 111 of the control apparatus 110 causes the display apparatus 300 to display the time axes T1, T2, and T3 of the respective manufacturing steps, the line segments S1 and S2 created by the first creation section 112A, and the display objects M and M1 associated with the manufacturing steps. As shown in FIG. 4(b), the display control apparatus 111 places the display objects M and M1 associated with the first step 1, the second step 2, and the third step 3 over the start times on the time axes T1, T2, and T3. In the example of FIG. 4, the display object M of larger circular shape representing the occurrence of a change in step characteristic factor is placed at the start times of the first step 1 and the third step 3, whereas the display object M1 of smaller circular shape representing no occurrence of any change in step characteristic factor is placed at the start time of the second step 2. Alternatively, the display object M may be displayed in different shapes depending on the presence or absence of any change in step characteristic factor. For example, the object of "circular shape" may be displayed when any change occurs, or the object of "diamond shape" may be displayed when no change occurs.

The second creation section 112B may identify the presence or absence of any change in step characteristic factor observed at each manufacturing step and create the display object M of variable size in accordance with the total value of the identified attribute changes (change values). Specifically, the display object can be used to represent the magnitude of the factor change, for example by increasing the size of the circular display object M in accordance with the number of the change values.

Figure 5:
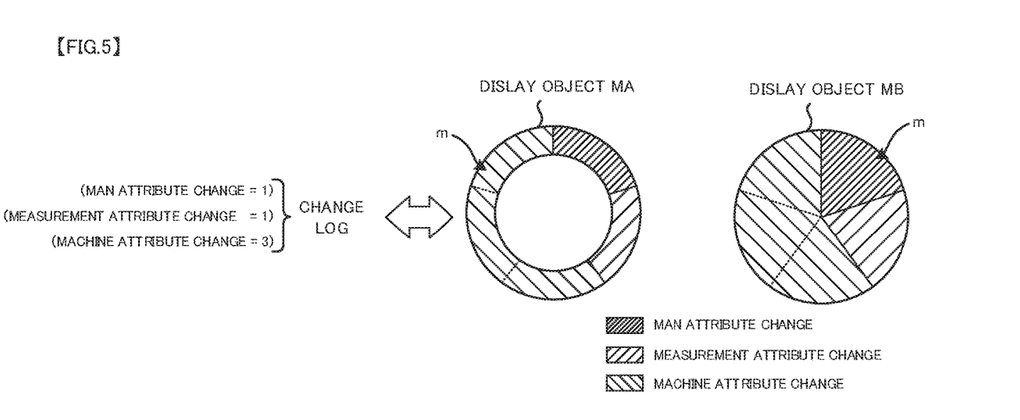
FIG. 5 A diagram showing examples of a change visualization mark (display object) according to Embodiment 1.

FIG. 5 shows different display examples of the display object M. Each of the illustrated display objects M has a size corresponding to the total of changes (change values) of the attributes identified as changed by the second creation section 112B and includes regions each representing the attribute of the changed step characteristic factor based on the change log 124 shown in FIG. 3.

The display objects in FIG. 4 and FIG. 5 are visualization marks for showing changes in step characteristic factor. In the example of FIG. 5, the second creation section 112B refers to the change log 124 to identify, for each attribute, any change in step characteristic factor observed at each manufacturing step. The second creation section 112B can create the display object M including the regions visually showing the attributes of the changed step characteristic factors and having a size adjusted in accordance with the total of the identified attribute changes (change values).

In the example of FIG. 5, each region m is a region for showing the attribute of each changed step characteristic factor. The region m is a region for allowing visual recognition of the percentage represented by each changed attribute (the type and percentage of a changed attribute).

For example, in the example of FIG. 5, a display object MA has regions m the form of pie chart. Since the total of the change values held is "5," the second creation section 112B divides the circular pie chart into five and allocates them to man attribute change "1," measurement attribute change "1," and machine attribute change "3." The regions allocated to the attributes are delimited, and for example, the delimited regions allocated to the attributes can be displayed in different colors for individual distinction, thereby allowing the changed attributes of the step characteristic factors to be visually recognized with ease. The machine attribute change can be displayed in a single combined region covering three regions. A display object MB has regions m in the form of pie chart. The second creation section 112B similarly displays the display object in the form of pie chart so as to allow visual recognition of the regions allocated to the attributes.

As described above, the display object M according to Embodiment 1 is adjusted in size based on the total change amount of the identified attribute changes and is created to include the regions m for representing the attributes of the changed step characteristic factors, so that the degree of the observed change in step characteristic factor is easy to recognize visually. For example, as the size of the display object M itself is increased, it can be seen that the change occurs in a factor more affecting the quality control at the manufacturing step. In other words, as the change value is reduced, no change occurs in such a factor more affecting the quality control.

In addition, the regions m allow the visual recognition of which attribute of the step characteristic factor changes, how many attributes change, and the percentages represented by the changed attributes.

As shown in FIG. 5, the display object M is adjusted in size and is created to include the regions m, which allows a clear understanding of the change amount of the factor affecting the quality control and the details of the change of the factor affecting the quality control.

As shown in FIG. 4(*b*), when no change occurs in step characteristic factor, the second creation section 112B can create the display object M1 representing that no change occurs in step characteristic factor. By way of example, a black circle M1 is placed at the start time in the example of FIG. 4(*b*). The display object M1 may be any object that represents that no change occurs in step characteristic factor, and the display object M and the display object M1 may be displayed in different shapes or appearances as appropriate to facilitate visual distinction between them.

Figure 6:
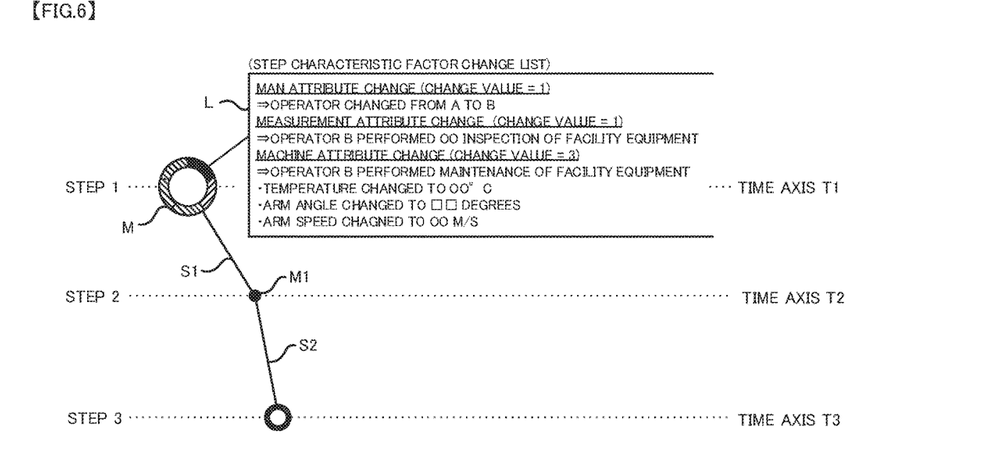
FIG. 6 A diagram showing a display example of a list of changes in step characteristic factor associated with the change visualization mark according to Embodiment 1.

FIG. 6 shows a display example of a list of changes in step characteristic factor associated with the display change visualization mark shown in FIG. 5. The display control section 111 can create a step characteristic factor attribute change list L showing the details of the identified attribute changes for each manufacturing step, in association with the display object M. The attribute change list L is provided by arranging the change log 124 of FIG. 3 in list form based on the attribute, and shows the details of the changes of the attributes constituting the display object M. Thus, the display object M and the change attribute list L at each manufacturing step are associated with each other and stored in the storage apparatus 120. For example, when the display object M is pointed or selected on the display apparatus 300 with input means such as mouse or touch panel operation, the display control section 111 can perform control to extract the change attribute list L associated with the pointed or selected display object M and to display the extracted change attribute list near the display object M or in a predetermined display area.

Figure 7:
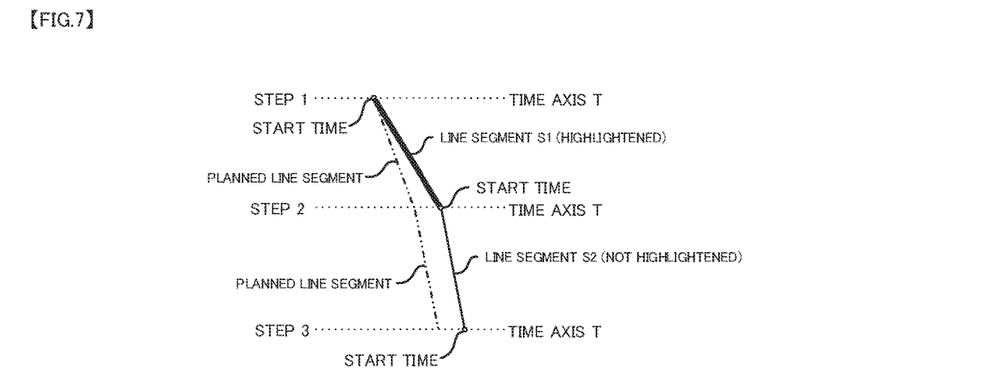
FIG. 7 A diagram for explaining an example of highlighting processing of a line segment connecting between manufacturing steps according to Embodiment 1

FIG. 7 is a diagram for explaining an example of highlighting processing of a line segment connecting between manufacturing steps according to Embodiment 1. As described above, the manufacturing of the product in the manufacturing line is performed based on the production planning, the production amount planning, and the manufacturing line time schedule planning (including planned time schedule values of the manufacturing steps constituting the manufacturing line).

The display control section 111 can refer to the manufacturing plan 121, compare each planned line segment connecting planned start times (or planned end times) between manufacturing steps based on planned processing period values of manufacturing steps in each product manufacturing unit with the line segment created by the first creation section 112A, and perform highlighting processing of the line segment different from the planned line segment by more than a predetermined tolerance to make distinction from any other line segment falling within the predetermined tolerance.

For example, when the slope of the line segment connecting between the manufacturing steps is smaller or larger than the slope of the planned line segment by more than the predetermined tolerance, the display control section 111 can perform highlighting processing of the line segment. In the example of FIG. 7, it can be seen that a line segment S1 between a manufacturing step 1 and a manufacturing step 2 has a smaller slope than the planned line segment and thus the actual processing period was longer than the planned value. Accordingly, the highlighting processing of the line segment S1 can be performed, for example through the use of a different color, different type of line, or different thickness from a line segment S2 as appropriate to allow visual distinction from the line segment falling within the tolerance from the planned value.

In the manufacturing plan 121, the slope of the planned line segment can be previously stored in the form of numerical value or graphics. The display control section 111 can numerically or graphically compare the planned line segment with the line segment between manufacturing steps obtained from the manufacturing record to determine whether or not the difference between them exceeds the predetermined tolerance, and perform the highlighting processing of the line segment if the difference exceeds the predetermined tolerance.

Figure 8:
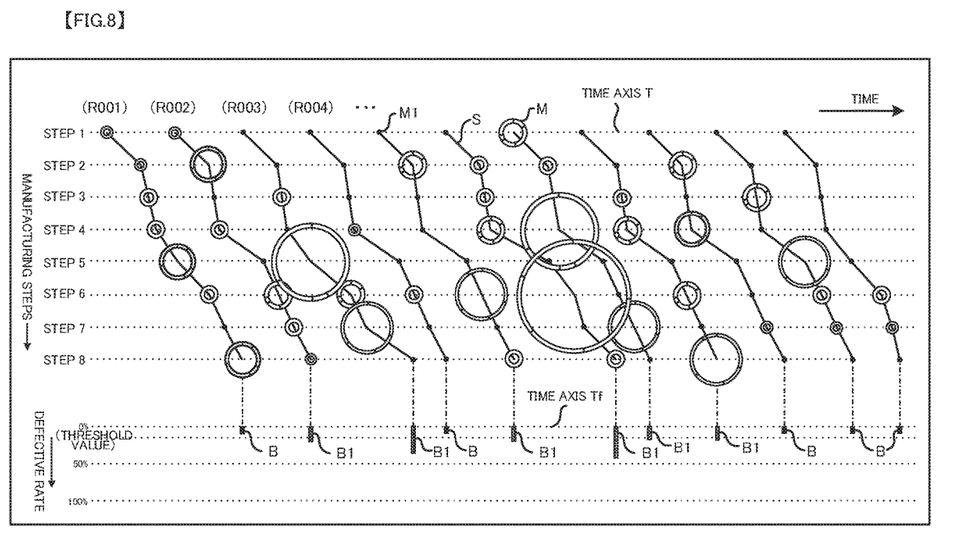
FIG. 8 A diagram showing an example of a visualization graph in the visualization system according to Embodiment 1.

FIG. 8 shows an example of a visualization graph in the visualization system according to Embodiment 1. FIG. 8 illustrates the example in which the display object M (MA) shown in FIG. 5 and the display object M1 shown in FIG. 4(*b*) are used. Specifically, each display object is displayed to include regions visually representing the changed attributes of step characteristic factors and to have a size adjusted in accordance with the total of the attribute changes (change values).

In the example of FIG. 8, the manufacturing line consists of 8 manufacturing steps, and in order from a step 1 to step 8 as the last step of each product manufacturing unit, the start times are connected between adjacent steps by line segments. For one lot, a time chart from the first step to the last step is formed.

Since each lot is input to each step after the preceding lot in the time course along the horizontal axis, the start times on the time axes of the steps of each lot after the lapse of predetermined time periods since the start times of the steps of the preceding lot are connected to each other by line segments to form the time chart. The time charts of the plurality of lots going through the manufacturing line constituted by the plurality of manufacturing steps are displayed side by side in time sequence, so that the manufacturing statuses (time schedules) at the manufacturing steps arranged in order are visualized to allow comparison between lots.

In the visualization processing of Embodiment 1, as shown in FIG. 8, the display control section 111 places information about defective rate of each product manufacturing unit on a time axis Tf in parallel with a time axis T of the manufacturing step and in relation to the last step of the plurality of manufacturing steps. The display control section 111 places a bar graph B representing the defective rate along the vertical axis with respect to the time axis Tf along the horizontal axis, so that the defective rates of the lots over time can be known.

The creation section 112 according to Embodiment 1 can further include the third creation section 112C which refers to the product event 123 and, based on information about defective rate of each product manufacturing unit, create the bar graph B having a length corresponding to the magnitude of the defective rate. The display control section 111 places the bar graph B of each product manufacturing unit on the time axis Tf in parallel with the time axis T of the manufacturing step and in relation to the last step of the plurality of manufacturing steps and performs highlighting processing for distinguishing a bar graph B1 representing a defective rate which exceeds a predetermined threshold value from the bar graph B representing a defective rate which does not exceed the predetermined threshold value.

In the example of FIG. 8, the predetermined threshold value for the defective rate is specified, and each of the bar graphs B and B1 formed to have a length corresponding to the magnitude of the defective rate extends in the vertical direction and is connected to the step 8 as, the last step through a chain line. The highlighting processing performed on the bar graph B1 may be any processing that facilitates visual distinction from the bar graph B representing the defective rate which does not exceed the threshold value. For example, the bar graphs B and B1 can be displayed in different colors. While FIG. 8 shows the example in which the defective rates are calculated and shown based on the processing results from all the steps, the present invention is not limited thereto. It is also possible to provide a mechanism for freely specifying the range in which the defective rate is calculated, for example. In this case, the defective rate is calculated from the steps within the specified range and is displayed as a bar graph. It is also possible that, when the displayed bar graph representing the defective rate is pointed or selected with input means such as mouse or touch panel operation, the range (steps) used to calculate the defective rate can be displayed as a balloon for visual recognition.

Figure 9:
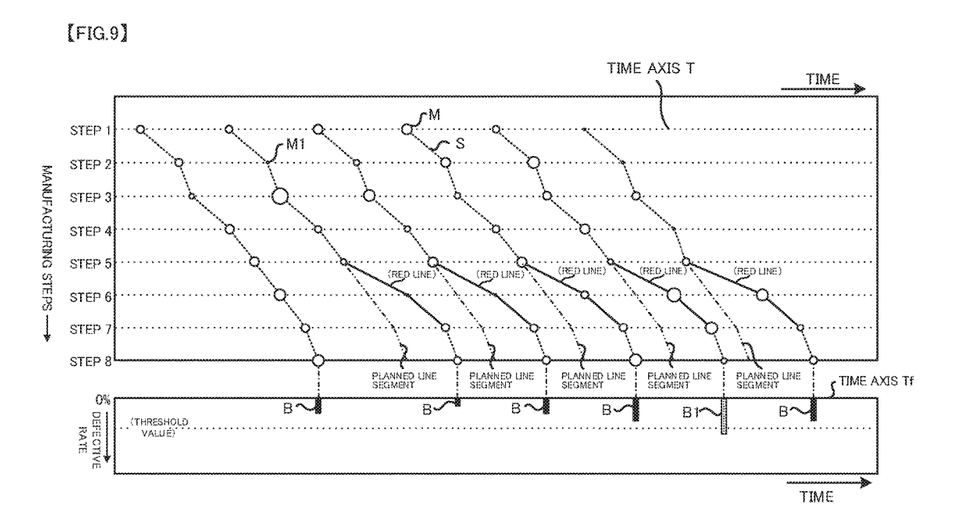
FIG. 9 A diagram showing another example of the visualization graph in the visualization system according to Embodiment 1.

FIG. 9 shows another example of the visualization graph in the visualization system 100 according to Embodiment 1. FIG. 9 illustrates the example in which the display object M shown in FIG. 4(*a*) is used. The display object M in FIG. 9 has a size corresponding to the change amount calculated by summing the identified attribute changes. For example, as the change amount (total change value) is increased, the circle has an increased size (area), and as the change amount is reduced, the circle has a reduced size. The processing for creating the display object M in FIG. 9 is performed by the second creation section 112B.

In the example of FIG. 9, the planned line segment is displayed together with the line segment S to facilitate visual recognition of how much the record deviates from the plan.

Figure 10:
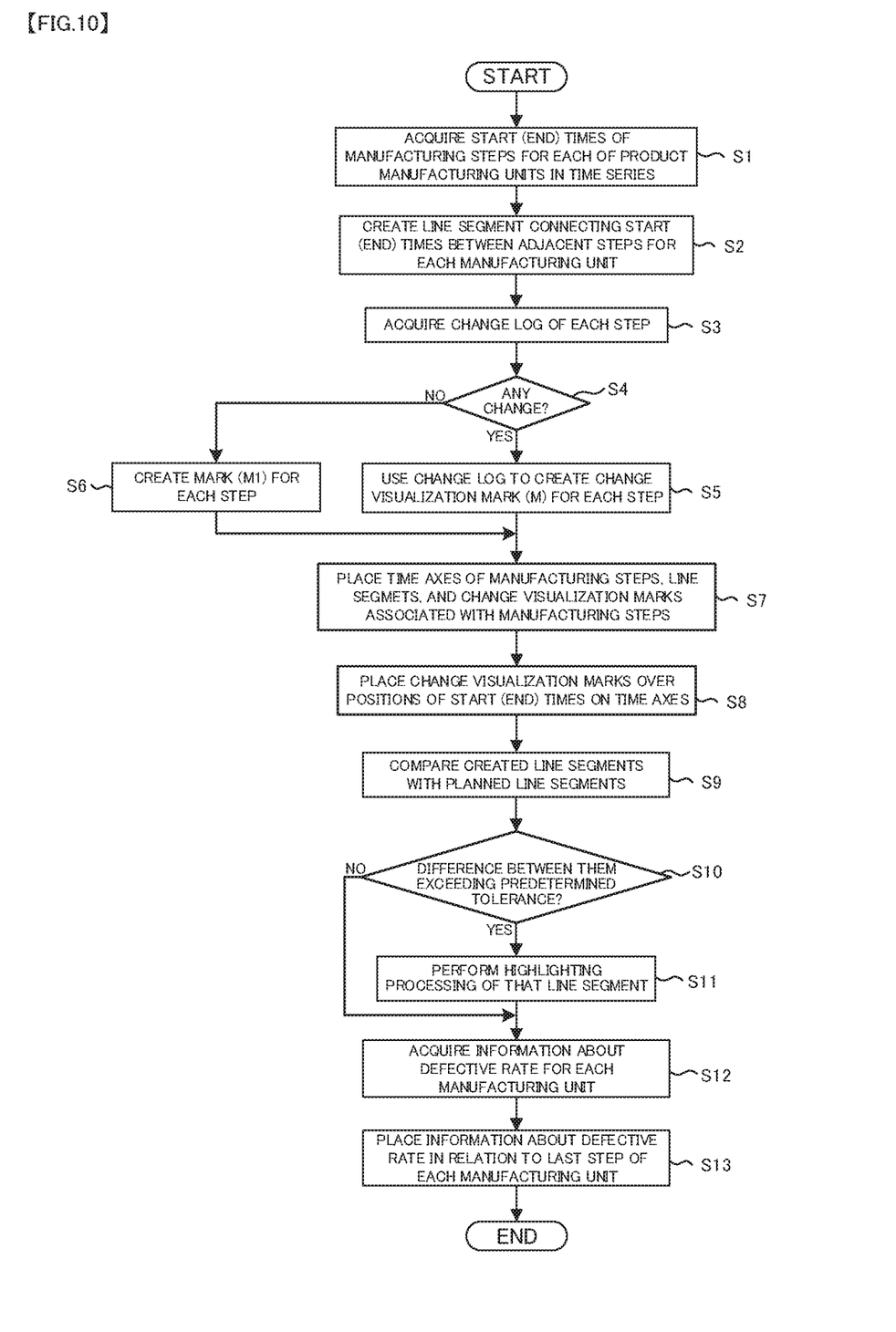
FIG. 10 A diagram showing a processing flow performed in the visualization system according to Embodiment 1.

FIG. 10 shows a processing flow performed in the visualization system 100 according to Embodiment 1. The control apparatus 110 obtains, from the storage apparatus 120, the start times of manufacturing steps for each of product manufacturing units arranged in time sequence (S1). The control apparatus 110 creates line segments connecting the start times between adjacent ones of the manufacturing steps for each manufacturing unit (S2). The control apparatus 110 acquires the change log 124 of each of the steps for each manufacturing unit (S3). The control apparatus 110 determines whether or not any change occurs in step characteristic factor (S4), and if it is determined that any change occurs (YES at S4), uses the change log 124 to create the change visualization mark (display object M) for each step (S5). On the other hand, if it is determined that no change occurs in step characteristic factor (NO at S4), the control apparatus 110 creates the mark (display object M1) for each step (S6).

The control apparatus 110 places the time axes of the manufacturing steps, line segments, and change visualization marks (M, M1) associated with the manufacturing steps, and places the change visualization marks (M, M1) over the positions of the start times on the time axes (S7, S8). If it is determined that no change occurs in step characteristic factor (NO at S4), the mark (display object M1) for each step may not be created. Specifically, the visualization mark itself may not be placed (not created) for the step at which no change occurs in step characteristic factor, and the visualization mark may be placed (created) only for the step at which any change occurs in step characteristic factor.

The control apparatus 110 compares the created line segment with the planned line segment (S9) and determines whether or not the difference between them exceeds the predetermined tolerance (S10). When the difference between the line segment and the planned line segment exceeds the predetermined tolerance (YES at S10), the control apparatus 100 performs highlighting processing of that line segment (S11).

The control apparatus 110 acquires information about defective rate from the storage apparatus 120 for each manufacturing unit (S12) and places the information about defective rate in relation to the last step of each manufacturing unit (S13). As described above, the information about defective rate displayed may be a defective rate of a group of steps within a single or a plurality of arbitrary ranges included in the manufacturing line, in addition to the defective rate of the lot undergoing the whole manufacturing line including the last step. In Embodiment 1, the information about defective rate is connected to is related to) the last step through the chain line to achieve the visualization as shown in FIG. 8, and the information can be displayed by means of the bar graph representing the defective rate of the steps within the specified range. In this case, the product event 123 of FIG. 2 can be configured to store the inspection results performed at the steps for each product manufacturing unit. The control apparatus 110 (third creation section 112C) may also place the information about defective rate of each step or a group of steps including two or more steps selected (specified) from all the steps in relation to the last step of each manufacturing unit.

Figure 11:
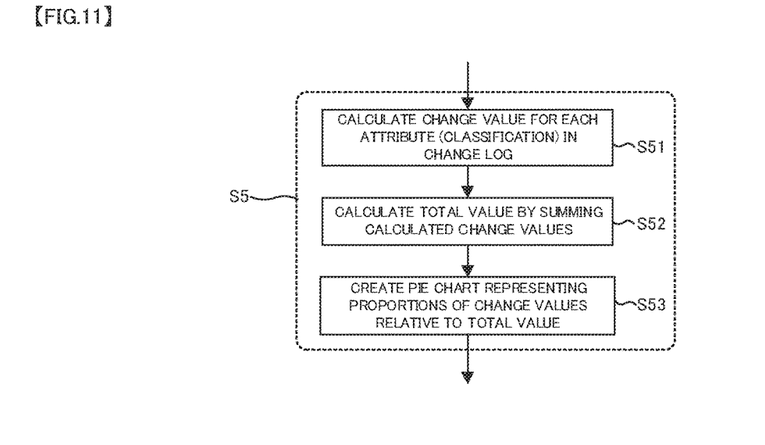
FIG. 11 A diagram showing a processing flow for creating the change visualization mark of FIG. 5.

FIG. 11 shows a processing flow for creating the change visualization mark at step S5 of FIG. 10 and this processing corresponds to the processing for creating the display object M shown in FIG. 5 and FIG. 8. The control apparatus 110 refers to the change log 124, calculates the change value of each attribute (classification) of a changed step characteristic factor (S51), and sums the calculated change values to obtain the total value (S52). The control apparatus 110 creates a pie chart representing the percentages of the change values relative to the total value (S53). At step S53, the size of the pie chart may be increased or reduced in accordance with the magnitude of the total of change values.

Figure 12:
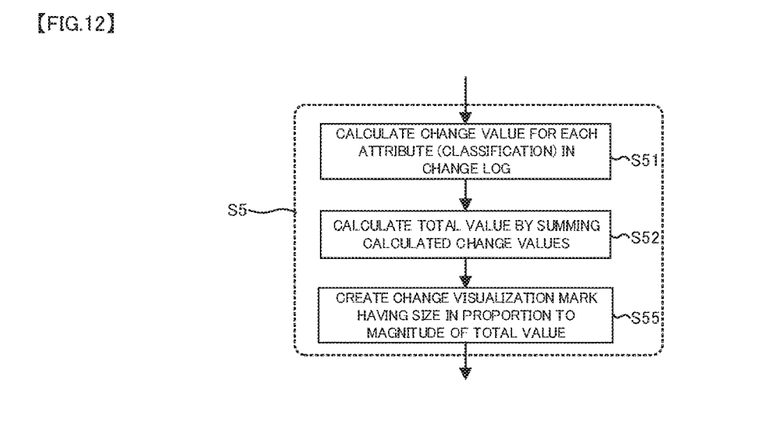
FIG. 12 A diagram showing a processing flow for creating the change visualization mark shown in FIG. 9.

FIG. 12 shows a processing flow for creating the change visualization mark shown in FIG. 9. In FIG. 12, step S51 and S52 are the same as those in FIG. 11, and the control apparatus 110 creates, for each step, a change visualization mark having a size in proportion to the magnitude of the total value of the change values (S55).

Figure 13:
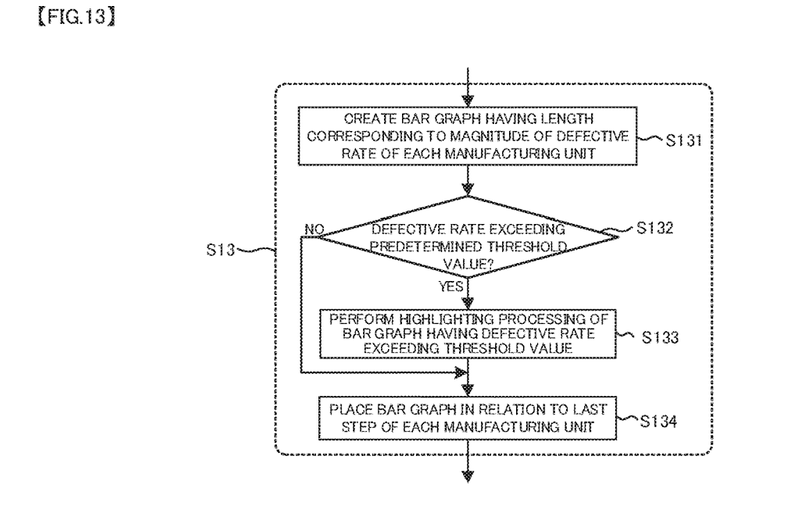
FIG. 13 A diagram showing a processing flow for placing information about defective rate.

FIG. 13 shows a processing flow for placing the information about defective rate at step S13 of FIG. 10. The control apparatus 110 refers to the storage apparatus 120 and creates the bar graph having a length corresponding to the magnitude of the defective rate of each product manufacturing unit (S131). The control apparatus 110 determines whether or not each defective rate exceeds the predetermined threshold value (132), and performs highlighting processing of the bar graph representing a defective rate determined as exceeding the threshold value (133). Then, the control apparatus 110 places the bar graph on the time axis Tf in parallel with the time axis T of the manufacturing step and in relation to the last step of the plurality of manufacturing steps for each product manufacturing unit (S134). The highlighting processing may be performed after the bar graph is placed at the position on the time axis Tf.

Since the visualization system according to Embodiment 1 can visualize any change in step characteristic factor to show the manufacturing status of each lot, the characteristic factor of each manufacturing step at high or low operation rate can be known properly. Thus, the action to be taken at each manufacturing step can be determined easily from the change in step characteristic factor to facilitate production management and quality control.

Since the information about defective rate can be visualized together to allow direct approach to the change in step characteristic factor in the lot having a high defective rate or the change in step characteristic factor in the lot having a low defective rate, an appropriate action to be taken on the changed step characteristic factor can be easily found in view of the defective rate.

Next, a variation of the display object for visualizing the product manufacturing status is shown.

Figure 14:
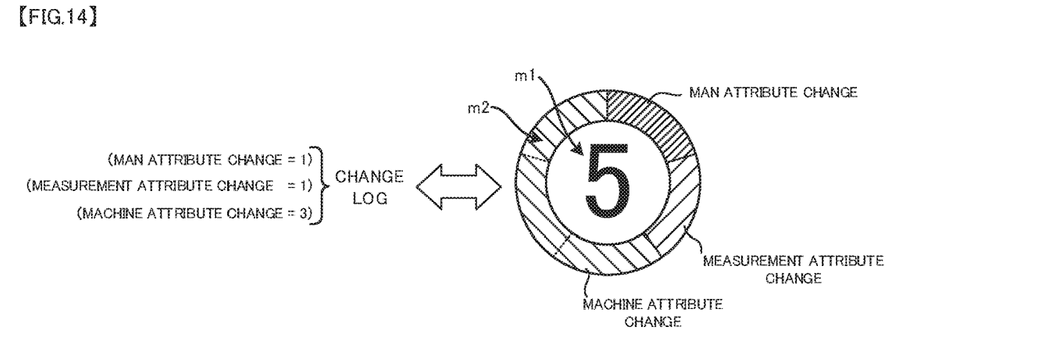
FIG. 14 A diagram showing a variation of the change visualization mark according to Embodiment 1.

FIG. 14 is a diagram showing the variation of the display object M according to Embodiment 1, and the variation is an example of the display object M created based on the change log 124 shown in FIG. 3. The display object M is a visualization mark for showing changes in step characteristic factor. The second creation section 112B refers to the change log 124 to identify, for each attribute, any change in step characteristic factor observed at each manufacturing step. The second creation section 112B can create the display object M having a size corresponding to the total of the identified attribute changes (change values) or including regions representing the attributes of the changed step characteristic factors.

In the example of FIG. 14, a first region m1 is a region for showing the magnitude of the total of the identified attribute changes (change values). The first region m1 is provided for displaying the total value "5," which is the total of the change values of the attributes. The second creation section 112B performs addition processing for summing the change values of the identified attributes and places the total value of the attribute changes in the first region m1.

In the example of FIG. 14, a second region m2 is a region for showing the attribute of each changed step characteristic factor. The second region m2 is a region for allowing visual recognition of the percentage represented by each changed attribute (the type and percentage of a changed attribute).

For example, in the example of FIG. 14, the second region m2 is shown in the form of pie chart. Since the total of the change values is "5," the second creation section 112B divides the circular pie chart into five and allocates them to man attribute change "1," measurement attribute change "1," and machine attribute change "3." The regions allocated to the attributes are delimited, and for example, the delimited regions allocated to the attributes can be displayed in different colors for individual distinction, thereby allowing the changed attributes of the step characteristic factors to be visually recognized with ease. The machine attribute change can be displayed in a single combined region covering three regions.

As described above, the display object M according to Embodiment 1 is created to include the first region m for representing the change amount calculated by summing the identified attribute changes and/or the second region m2 for representing the attributes of the changed step characteristic factors, so that the degree of the observed change in step characteristic factor is easy to recognize visually. For example, as the change value shown in the first region m1 is increased, it can be seen that the change occurs in a factor more affecting the quality control at the manufacturing step. In other words, as the change value is reduced, no change occurs in such a factor more affecting the quality control.

In addition, the region m2 allows the visual recognition of which attribute of the step characteristic factor changes, how many attributes change, and the percentages represented by the changed attributes.

As shown in the example of FIG. 14, the display object M including both of the first region m1 and the second region m2 is created, which allows a clear understanding, of the change amount of the factor affecting the quality control and the details of the change of the factor affecting the quality control.

Figure 15:
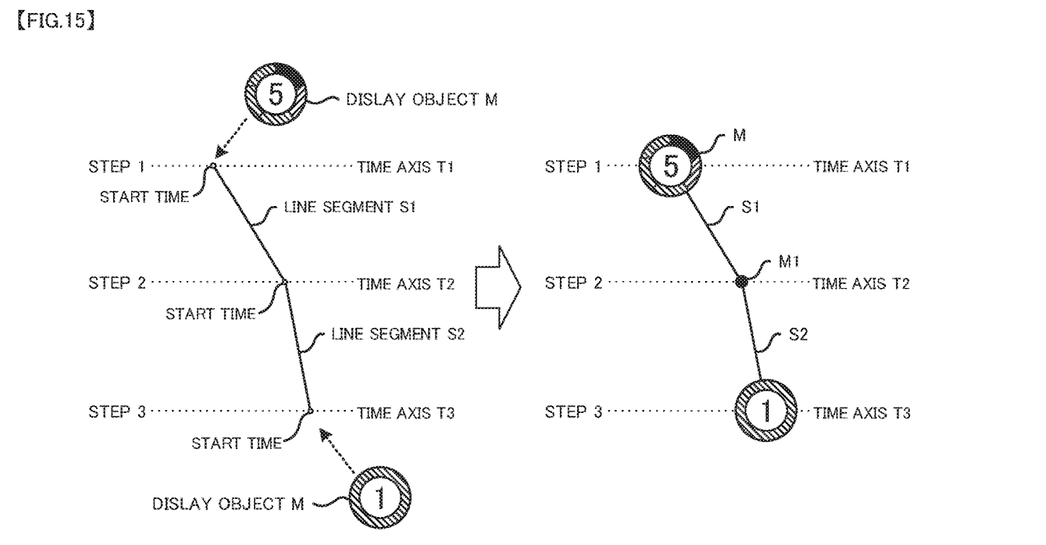
FIG. 15 A diagram showing a variation of the visualization of a manufacturing status according to Embodiment 1.

It should be noted that the display object in FIG. 14 can be used to perform the visualization shown in FIG. 4. This example is illustrated in FIG. 15. As shown in FIG. 15, when no change occurs in step characteristic factor, the second creation section 112B can create the display object M1 representing that no change occurs in step characteristic factor. By way of example, a black circle M1 is placed at the start time in the example of FIG. 15. Since the display object M1 may be any object that represents that no change occurs in step characteristic factor, the display object M shown in FIG. 14 can be altered such that "0" is displayed in the first region m1 or the second region m2 is displayed in white, for example. The display object M and the display object M1 may be displayed in different shapes or appearances as appropriate to facilitate visual distinction between them.

Figure 16:
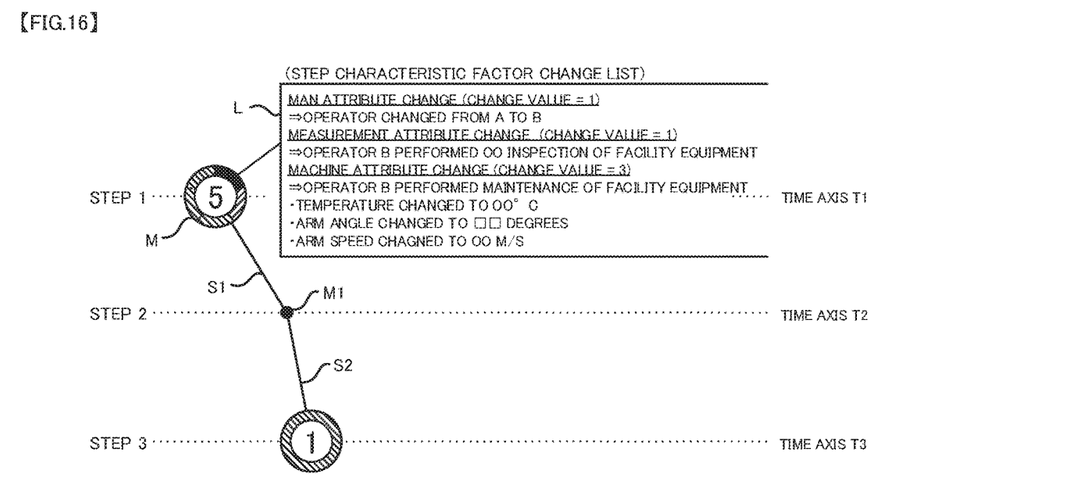
FIG. 16 A diagram showing a display example of a list of changes in step characteristic factor associated with the change visualization mark in the variation of Embodiment 1.

FIG. 16 shows a display example of a list of changes in step characteristic factor associated with the display change visualization mark shown in FIG. 14. The display control section 111 can create a step characteristic factor attribute change list L showing the details of the identified attribute changes for each manufacturing step, in association with the display object M. The attribute change list L is provided by arranging the change log 124 of FIG. 3 in list form based on the attribute, and shows the details of the changes of the attributes constituting the display object M. Thus, the display object M and the change attribute list L at each manufacturing step are associated with each other and stored in the storage apparatus 120. For example, when the display object M is pointed or selected on the display apparatus 300, the display control section 111 can perform control to extract the change attribute list L associated with the pointed or selected display object M and to display the extracted change attribute list near the display object M or in a predetermined display area.

Figure 17:
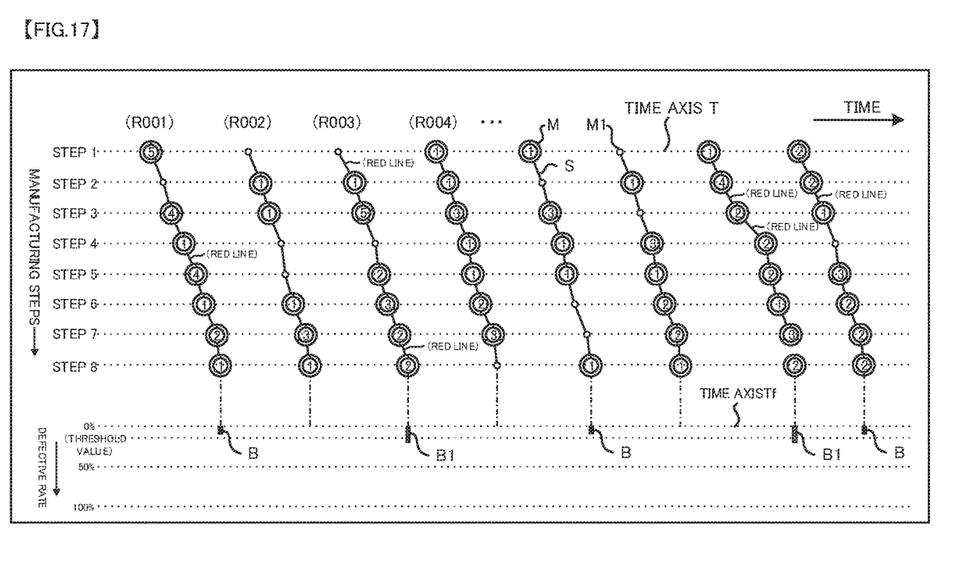
FIG. 17 A diagram showing a variation of the visualization graph in the visualization system according to Embodiment 1.

The visualization graph shown in FIG. 8 can also be displayed as shown in FIG. 17 by using the display object of FIG. 14. FIG. 17 is a diagram showing a variation of the visualization graph in the visualization system according to Embodiment 1. FIG. 17 illustrates an example in which the display objects M and M1 shown in FIG. 14 are used.

In the example of FIG. 18, the manufacturing line consists of 8 manufacturing steps, and in order from a step 1 to step 8 as the last step of each product manufacturing unit, the start times are connected between adjacent steps by line segments. For one lot, a time chart from the first step to the last step is formed.

Since each lot is input to each step after the preceding lot in the time course along the horizontal axis, the start times on the time axes of the steps of each lot after the lapse of predetermined time periods since the start times of the steps of the preceding lot are connected to each other by line segments to form the time chart. The time charts of the plurality of lots going through the manufacturing line constituted by the plurality of manufacturing steps are displayed side by side in time sequence, so that the manufacturing statues (time schedules) at the manufacturing steps arranged in order are visualized to allow comparison between lots.

In the visualization processing of Embodiment 1, as shown in FIG. 17, the display control section 111 places information about defective rate of each product manufacturing unit on a time axis Tf in parallel with a time axis T of the manufacturing step and in relation to the last step of the plurality of manufacturing steps. The display control section 111 places a bar graph B representing the defective rate along the vertical axis with respect to the time axis Tf along the horizontal axis, so that the defective rates of the lots over time can be known.

The creation section 112 according to Embodiment 1 can further include the third creation section 112C which refers to the product event 123 and, based on information about defective rate of each product manufacturing unit, create the bar graph B having a length corresponding to the magnitude of the defective rate. The display control section 111 places the bar graph B of each product manufacturing unit on the time axis Tf in parallel with the time axis T of the manufacturing step and in relation to the last step of the plurality of manufacturing steps and performs highlighting processing for distinguishing a bar graph B1 representing a defective rate which exceeds a predetermined threshold value from the bar graph B representing a defective rate which does not exceed the predetermined threshold value.

In the example of FIG. 17, the predetermined threshold value for the defective rate is specified, and each of the bar graphs B and B1 formed to have a length corresponding to the magnitude of the defective rate extends in the vertical direction and is connected to the step 8 as the last step through a chain line. The highlighting processing performed on the bar graph B1 may be any processing that facilitates visual distinction from the bar graph B representing the defective rate which does not exceed the threshold value. For example, the bar graphs B and B1 can be displayed in different colors.

The display object in this variation can be used for display to show the number of change values and the factors. When the processing flow for creating the change visualization mark shown in FIG. 11 is applied to this variation, the control apparatus 110 performs, after step S53, the step of creating the change visualization mark (display object M) which includes the first region m1 showing the total value and the second region m2 created in the form of pie chart.

While Embodiment 1 has been described, the functions providing the visualization system 100 described above can be implemented by a program. A computer program previously provided for implementing each function can be stored on an auxiliary storage apparatus, the program stored on the auxiliary storage apparatus can be read by a control section such as a CPU to a main Storage apparatus, and the program read to the main storage apparatus can be executed by the control section to perform the function of each component.

The program may be recorded on a computer readable recording medium and provided for the computer. Examples of the computer readable recording medium include optical disks such as a CD-ROM, phrase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present immersion. The embodiment and its variations are encompassed within the spirit or scope of the present invention and within the invention set forth in the claims and the equivalents thereof.

DESCRIPTION OF THE REFERENCE NUMERALS

100 VISUALIZATION SYSTEM
110 CONTROL APPARATUS
111 DISPLAY CONTROL SECTION
112 CREATION SECTION
112A FIRST CREATION SECTION
112B SECOND CREATION SECTION
112C THIRD CREATION SECTION
120 STORAGE APPARATUS
121 MANUFACTURING PLAN
122 MANUFACTURING RECORD
123 PRODUCT EVENT
124 CHANGE LOG
300 DISPLAY APPARATUS
M, M1 DISPLAY OBJECT
m REGION
m1 FIRST REGION
m2 SECOND REGION
T, Tf TIME AXIS
S, S1, S2 LINE SEGMENT

The invention claimed is:

1. A visualization system for visualizing a manufacturing status of a product manufactured through a plurality of manufacturing steps in order, comprising:
a first creation section configured to create, for each product manufacturing unit, a line segment connecting a start time or an end time of a first step on a time axis of the first step to a start time or an end time of a second step subsequent to the first step on a time axis of the second step in parallel with the time axis of the first step;
a second creation section configured to identify, based on a change log of a step characteristic factor at each manufacturing step, any change in step characteristic factor observed at each of the first step and the second step, and to create a display object representing a magnitude of the identified change in step characteristic factor or including a region representing an attribute of the changed step characteristic factor; and
a display control section configured to cause a display apparatus to display the time axis of each manufacturing step, the line segment created by the first creation section, and the display object associated with each manufacturing step, and to cause the display apparatus to display the display object associated with the first step and the display object associated with the second step such that these display objects are placed over positions of the start times or the end times on the time axes of their associated steps,
wherein the display control section is configured to place information about defective rate of each product manufacturing unit on a time axis in parallel with the time axis of the manufacturing step and in relation to a last step of the plurality of manufacturing steps.

2. The visualization system according to claim 1, wherein the step characteristic factor includes at least attributes of Man, Machine, Material, and Method, and
the second creation section is configured to identify, for each attribute, any change in step characteristic factor observed at each manufacturing step, and to create the display object having a site corresponding to the total of the identified attribute changes or including regions representing the attributes of the changed step characteristic factors.

3. The visualization system according to claim 2, wherein the second creation section is configured to create the display object including the regions representing the attributes of the changed step characteristic factors and having a size adjusted in accordance with a change amount calculated by summing the identified attribute changes.

4. The visualization system according to claim 2, wherein the second creation section is configured to create the display object of variable size in accordance with a change amount calculated by summing the identified attribute changes.

5. The visualization system according to claim 2, wherein the display control section is configured to create a change list showing details of the identified attribute changes for each manufacturing step and to display the change list in association with the display object.

6. The visualization system according to claim 1, further comprising a third creation section configured to create, based on the information about defective rate of each product manufacturing unit, a bar graph having a length corresponding to a magnitude of the defective rate,
wherein the display control section is configured to place the bar graph of each product manufacturing unit on the time axis in parallel with the time axis of the manufacturing step and in relation to the last step of the plurality of manufacturing steps and to perform highlighting processing for distinguishing the bar graph representing a defective rate which exceeds a predetermined threshold value from the bar graph representing a defective rate which does not exceed the predetermined threshold value.

7. The visualization system according to claim 1, wherein the display control section is configured to compare a planned line segment connecting planned start times or planned end times between the first step and the second step based on planned processing period values of the manufacturing steps in the product manufacturing unit with the line segment created by the first creation section, and to perform highlighting processing of the line segment different from the planned line segment by more than a predetermined tolerance to make distinction from the line segment falling within the predetermined tolerance.

8. A display apparatus for displaying a manufacturing status of a product manufactured through a plurality of manufacturing steps in order, comprising:
a first creation section configured to create, for each product manufacturing unit, a line segment connecting a start time or an end time of a first step on a time axis of the first step to a start time or an end time of a second step subsequent to the first step on a time axis of the second step in parallel with the time axis of the first step;
a second creation section configured to identify, based on a change log of a step characteristic factor at each manufacturing step, any change in step characteristic factor observed at each of the first step and the second step, and to create a display object representing a magnitude of the identified change in step characteristic factor or including a region representing an attribute of the changed step characteristic factor; and
a display control section configured to cause the display apparatus to display a line segment representing the time axis of each manufacturing step, the line segment created by the first creation section, and the display object associated with each manufacturing step, and to place the display object associated with the first step and the display object associated with the second step over positions of the start times or the end times on the time axes of their associated steps,
wherein the display control section is configured to place information about defective rate of each product manufacturing unit on a time axis in parallel with the time axis of the manufacturing step and in relation to a last step of the plurality of manufacturing steps.

9. A non-transitory computer readable medium including a computer readable program for visualizing a manufacturing status of a product manufactured through a plurality of manufacturing steps in order, the program comprising instructions which, when executed by a computer, cause the computer to perform:
first processing of creating, for each product manufacturing unit, a line segment connecting a start time or an end time of a first step on a time axis of the first step to a start time or an end time of a second step subsequent to the first step on a time axis of the second step in parallel with the time axis of the first step;
second processing of identifying, based on a change log of a step characteristic factor at each manufacturing step, any change in step characteristic factor observed at each of the first step and the second step, and creating a display object representing a magnitude of the identified change in step characteristic factor or including a region representing an attribute of the changed step characteristic factor; and
third processing of causing a display apparatus to display a line segment representing the time axis of each manufacturing step, the line segment created by the first processing, and the display object associated with each manufacturing step, and placing the display object associated with the first step and the display object associated with the second step over positions of the start times or the end times on the time axes of their associated steps,
wherein the third processing causes to place information about defective rate of each product manufacturing unit on a time axis in parallel with the time axis of the manufacturing step and in relation to a last step of the plurality of manufacturing steps.

* * * * *